United States Patent [19]

Yamaguchi et al.

[11] Patent Number: 4,561,770

[45] Date of Patent: Dec. 31, 1985

[54] MAGNIFICATION CHANGING DEVICE FOR COPYING MACHINE

[75] Inventors: Isao Yamaguchi, Yokohama; Yusuke Sasamori, Atsugi; Hideo Takaoka, Tokyo, all of Japan

[73] Assignee: Matsushita Electric Industrial Co., Ltd., Osaka, Japan

[21] Appl. No.: 624,781

[22] Filed: Jun. 21, 1984

[30] Foreign Application Priority Data

Jun. 30, 1983 [JP] Japan ................................ 58-119715

[51] Int. Cl.[4] ........................ G03B 27/34; G03B 27/40

[52] U.S. Cl. ........................................ 355/57; 355/60; 355/66

[58] Field of Search ........................ 355/57, 58, 59, 60, 355/65, 66, 56

[56] References Cited

U.S. PATENT DOCUMENTS

| | | | |
|---|---|---|---|
| 3,901,586 | 8/1975 | Suzuki et al. | 355/57 |
| 4,047,811 | 9/1977 | Allis et al. | 355/14 |
| 4,453,824 | 6/1984 | Miyake et al. | 355/57 |

FOREIGN PATENT DOCUMENTS 39057 3/1982 Japan .

*Primary Examiner*—L. T. Hix

*Assistant Examiner*—Brian W. Brown

*Attorney, Agent, or Firm*—Spencer & Frank

[57] ABSTRACT

A magnification changing device for use in a copying machine, capable of effecting a scale-up and-down magnification of a manuscript. The device has a first reflecting mirror system adapted to be moved at a constant speed and arranged to receive the optical image from an object, and a second reflecting mirror system adapted to receive the light reflected by the first reflecting mirror system and to move in the same direction as the first reflecting mirror system at a speed which is a half that of the movement of the first reflecting mirror system. The device also has a fixed magnifier lens upon which the light reflected by the second reflecting mirror system impinges, a movable third reflecting mirror system adapted to receive the light coming through the lens, and a magnification changing mechanism for moving the reflecting mirror systems in synchronism with each other such that a relationship corresponding to varying magnification degree is maintained between the distance between the first and second reflecting mirror systems and the distance between the lens and the third reflecting mirror system. According to this arrangement, any desired magnification degree is set by the magnification changing mechanism while focussing the light from the third reflecting mirror system.

7 Claims, 5 Drawing Figures

MAGNIFICATION CHANGING DEVICE FOR COPYING MACHINE

BACKGROUND OF THE INVENTION

1. Field of the Invention

The present invention relates to a device for changing the copying magnification in a copying machine which is capable of scaling up and down the size of a copy as required.

2. Description of the Prior Art

Nowadays, many copying machines, either the manuscript fixing type or manuscript moving type, incorporate magnification changing devices. A typical known magnification changing device has a combination of a constant-speed mirror and a half-speed mirror which are movable at a speed ratio of 2:1 to change the positional relationship therebetween, and a lens which moves in proportion to the change of the positional relationship between these mirrors. In another known magnification changing device, a plurality of lenses mounted in the body of the copying machine are used selectively to provide various degrees of magnification.

Anyway, in the magnification changing device, it is necessary that the distance a between an object and a magnification lens and the distance b between an image and the same lens are varied to meet the following condition in order to obtain the desired degree of magnification which is given as the ratio a/b, i.e. the ratio of the distance a to the distance b:

$$1/a+1/b=1/f$$

where, f represents the focal distance of the lens. In order to move the mirrors and lens while satisfying the above-mentioned condition, the device incorporates independent cams or similar actuating means as well as power sources such as motors, for the respective mirrors and lens. Consequently, the mechanism of the magnification changing device is highly complicated thus raising the cost of the device.

In addition, the following problem is encountered when the magnification changing device employs a cam mechanism for setting the positions of the reflecting mirrors and the lens for the purpose of attaining the desired degree of magnification. Namely, in such a case, the design of the cam becomes difficult particularly when the magnification degree is around 1.0. Thus, the known magnification changing device incorporating the cam mechanism is capable of effecting only a limited amount of change in the degree of magnification thus limiting the range for scaling up and down the copy size.

Furthermore, the known magnification changing device generally has a large size which increases the size of the copying machine as a whole.

It is to be pointed out also that the changing of magnification is possible only by fixed amounts, requiring troublesome manipulation when moving the mirrors and lens to the preselected positions corresponding to the desired magnification degree. Namely, the known magnification changing device is not constructed such as to permit focussing by means of a freely selected change in the degree of magnification. Thus, the known magnification changing device is still unsatisfactory from the user's point of view.

SUMMARY OF THE INVENTION

Accordingly, an object of the invention is to provide a magnification changing device for a copying machine, having a simplified construction but having a high degree of freedom of selection of the copy size in scaling up and down and capable of allowing focussing at any desired magnification, thereby to overcome the above-described problems of the prior art.

Another object of the invention is to provide a magnification changing device which permits easy focussing in order to compensate for any fluctuation or deviation of the focal distance of the lens.

Still another object of the invention is to provide a magnification changing device in which the reflecting mirrors which are moved for scaling down or up the copy are guided by one or a minimal number of guide members so as to minimize misalignment of the optical axis and to facilitate correction if necessary.

A further object of the invention is to provide a magnification changing device in which the power for the magnification changing operation is derived from a driving motor which is integrally mounted within the copying machine for effecting the optical scanning of the manuscript, thereby eliminating the necessity for any additional power source and enabling a simplification of the construction of, and reduction in cost of the magnification changing device and, hence, of the copying machine as a whole.

To these ends, according to the invention, there is provided a magnification changing device for a copying machine comprising: a first reflecting mirror system adapted to move at a constant speed; a second reflecting mirror system adapted to run at a speed which is a half the speed of the first reflecting mirror system; a fixed lens; a third reflecting mirror system having mirrors disposed at the opposite side of said lens to said first and second reflecting mirror systems; and a magnification changing mechanism adapted to change the distance between the first reflecting mirror system and the second reflecting mirror system and the distance between the lens and the third reflecting mirror system while maintaining a predetermined relationship between these distances, thereby attaining the desired degree of magnification.

These and other objects, features and advantages of the invention will become clear from the following description of the preferred embodiments when the same is read in conjunction with the accompanying drawings.

DESCRIPTION OF THE PREFERRED EMBODIMENT

The invention will be described in detail hereinunder with reference to the attached drawings which show a preferred embodiment of the invention.

Figure 1:
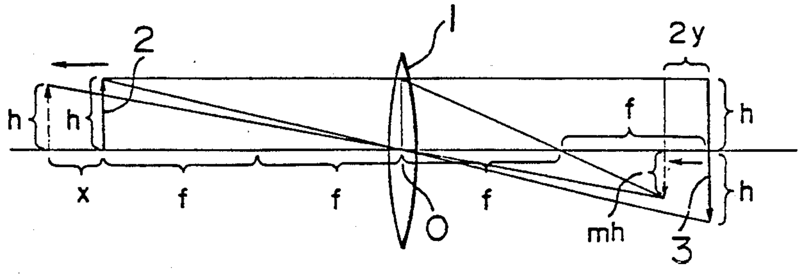
FIG. 1 is an illustration of an optical system for obtaining an image of a reduced size.

FIG. 1 diagrammatically shows an optical system for obtaining an image of a reduced size. This optical system incorporates a lens having a focal distance f. An object 2 is disposed at one side of the lens 1 at a distance 2f from the center O of the lens, so that the image 3 of the object 2 is formed at the other side of the lens 1 at the same distance 2f. In this case, the size of the image 3 is the same as that of the object 2: namely, the degree of magnification is 1.0. However, when the object 2 is moved by a distance x from the position of the distance 2f away from the lens 1, the image 3 is moved by a distance 2y from the position of distance 2f toward the lens 1. In this case, the size of the image 3 is reduced as compared with the size of the object 2.

The following relationships exist in the optical system shown in FIG. 1.

$$\frac{mh}{h} = \frac{2f - y}{2f + x} \quad (1)$$

$$\frac{f}{h} = \frac{mh}{f - 2y} \quad (2)$$

where, h represents the height of the object 2, while mh represents the height of the image of reduced size. (m represents the ratio between the height of the object and that of the image.)

The following formula (I) is obtained by eliminating m and h from formulae (1) and (2).

$$y = \frac{fx}{2f + 2x} \quad (I)$$

The principle of scaling up and down the size of a copy will be explained hereinunder with specific reference to FIG. 2. A first straight line 4 and a second straight line 5 intersect each other at an angle $\theta$. A straight line 7 is extended vertically downward from a point 6 on the line 4 to cross the line 5 at a point 8. The distance between the points 6 and 8 is expressed by A. The line 7 is further extended downward to a point 9 spaced from the point 8 by the same distance A. A line 11 is drawn from the point 9 to a point 10 which is on the first line 4 and spaced by a distance x from the point 6. The straight line 11 intersects the second straight line 5 at a point 12. The distance between the point 12 and the vertical straight line 7 as measured in parallel with the first straight line 4 is expressed by y. The following relationship exists in this diagram.

$$\frac{x}{2A} = \frac{y}{A - y\tan\theta} \quad (3)$$

The formula (3) can be transformed into the following formula (II).

$$y = \frac{Ax}{2A + x\tan\theta} \quad (II)$$

It will be seen that the formulae (I) and (II) coincide together if the following condition is satisfied $$f = 2A/\tan\theta. \quad (III)$$

The scaling down mode is obtained when the point 10 is disposed at the right side of the point 6 on the first line 4, while a scaling up mode is obtained when the point 10 is located at the left side of the point 6. The equal size mode is obtained when the point 10 is located on the same position as the point 6.

Figure 3:
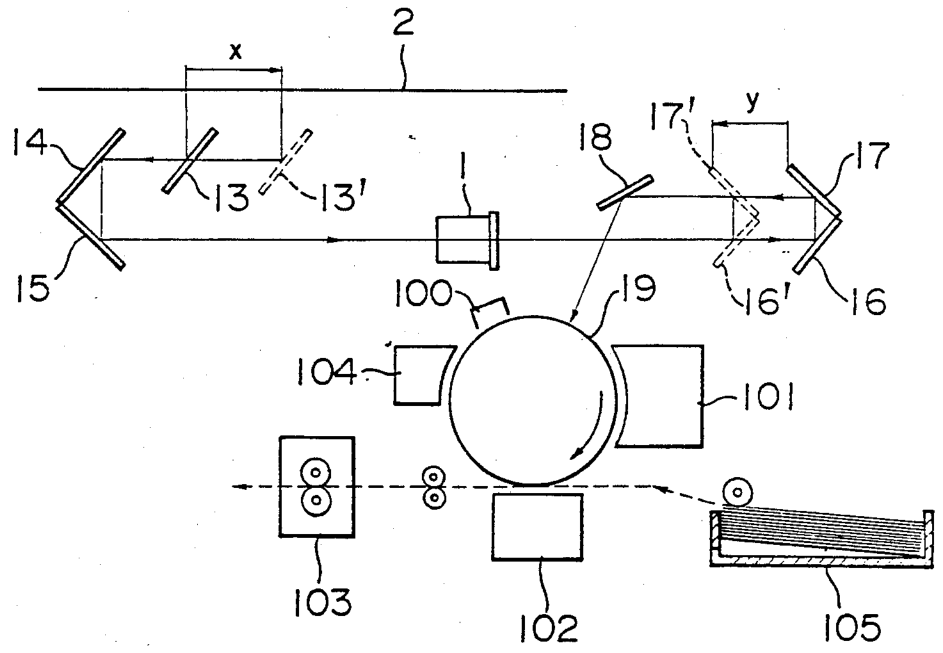
FIG. 3 is a schematic illustration of arrangement of a lens and mirrors in an embodiment of the magnification changing device of the invention.

The magnification changing device of the invention has reflecting mirrors and a lens which are arranged in a manner explained with specific reference to FIG. 3. The device has six mirrors 13 to 18, referred to as first to sixth mirrors, respectively, and a lens 1. The first reflecting mirror system constituted by the first mirror 13 is inclined at an angle of 45° to the plane of the object 2 (e.g. a manuscript). A second mirror 14 has a reflecting surface which is parallel to the reflecting surface of the first reflecting mirror 13, while a third mirror 15 has a reflecting surface which orthogonally faces the reflecting surface of the second mirror 14. The second and third mirrors in combination constitute a second reflecting mirror system. The first reflecting mirror system and the second reflecting mirror system are adapted to move at a speed ratio of 2:1. The optical axis of the lens 1 extends in parallel with the plane of the object which is in this case the plane of the manuscript to be copied. The fourth mirror 16 is disposed to face the third mirror orthogonally and is inclined to the optical axis of the lens at 45° so as to orthogonally reflect the light coming along the optical axis. The fifth mirror 17 is formed integrally with the fourth mirror 16 at a right angle to the latter. The fourth mirror 16 and the fifth mirror 17 in combination constitute a third reflecting mirror system. Consequently, the light coming through the lens 1 is reflected back. The light thus reflected back is bent further by a sixth mirror 18 and is projected onto the surface of the photosensitive drum 19. In this embodiment, the lens 1 is fixedly mounted on the copying machine. The copying machine shown in FIG. 3 further has an electrostatic charger 100, developing device 101, transfer device 102, fixing device having a heating roller 103, toner cleaning device 104, and a cassette-type paper feeder 105.

For scaling down the image of the object 2, the first mirror system 13 is moved by a distance x toward the lens 1 to a position indicated by a numeral 13', while moving the third reflecting mirror system 16,16 by a distance y toward the lens 1 to the position indicated by numerals 16',17'. It will be seen that the light can be focussed to form a clear image provided that the distances x and y of movement satisfy the condition expressed by the formula (I) mentioned before.

The light coming through the lens 1 is reflected back by the third reflecting mirror system. Therefore, the movement of the third reflecting mirror system by the distance y causes the image to move toward the lens by a distance 2y. This relation well coincides with that illustrated in FIG. 1.

Thus, according to the invention, it is possible to obtain a magnification changing device which can ensure the focussing of light at any desired degree of magnification, by a mechanism which has a construction satisfying the requirement of the formula (II) and adapted to operate the first and third reflecting mirror systems while keeping therebetween the relationship given by the formula (III).

A practical embodiment of the magnification changing device of the invention, making use of the principal explained hereinabove, will be described with reference to FIGS. 4 and 5 which show the optical system of such an embodiment. In this optical system, the first reflecting mirror system and the second reflecting mirror system are adapted to be moved at a speed ratio of 2:1, while the movement of the first reflecting mirror system and the movement of the third reflecting mirror system are so related to each other as to ensure the focussing of the light at any desired degree of magnification.

Figure 4:
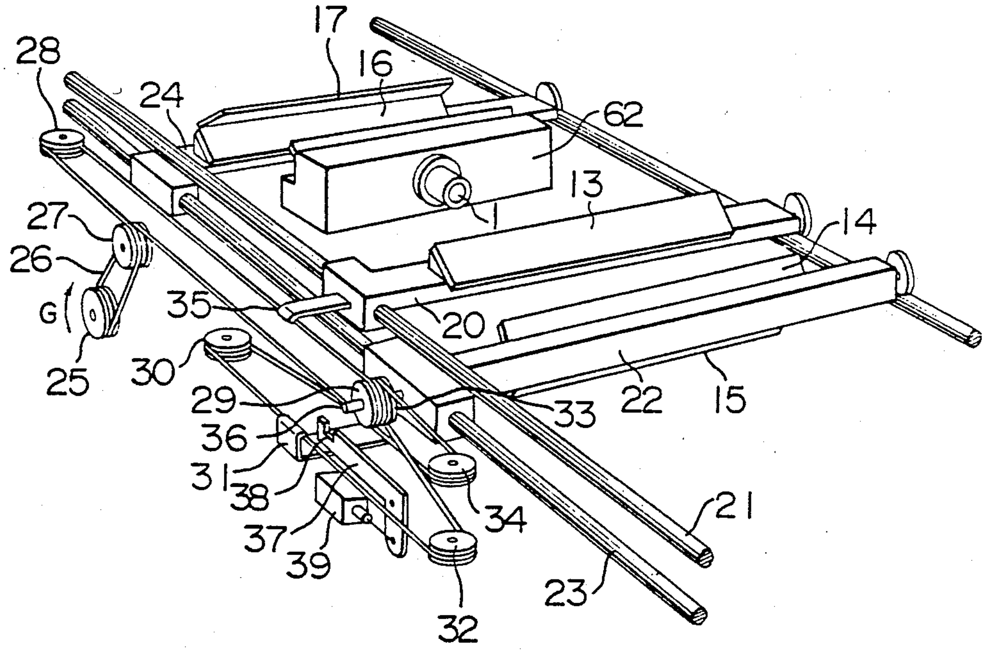
FIG. 4 is a perspective view of an essential part of the optical system in accordance with the invention.

Referring first to FIG. 4, the first reflecting mirror system 13 is supported by a constant-speed supporting member (also referred to as "first supporting member") which in turn is adapted to slide along first guide shafts 21 arranged in parallel with the optical axis of the lens 1. The second mirror 14 and the third mirror 15 which in combination constitute a second reflecting mirror system is supported by the half-speed supporting member 22 (also referred to as "second supporting member") which are slidably held by second guide shafts 23 extended in parallel with the first guide shafts 21. The fourth mirror 16 and the fifth mirror 17 constituting the third reflecting mirror system are secured to a third supporting member 24 which is also slidable along the second guide shafts 23. The constant-speed supporting member 20 and the half-speed supporting member 22 are adapted to be driven by a wire system for driving the optical system, at a speed ratio of 2:1.

According to the invention, the constant-speed supporting member 20, which is adapted to travel over the entire length of the manuscript, is adapted to slide along first guide shafts 21 prepared specifically for this supporting member 20. On the other hand, the half-speed supporting member 22 and the third supporting member 24, which are disposed at the front and rear sides of the lens 1, make common use of the second guide shafts 23. Consequently, the construction of the magnification changing mechanism is made simple and compact. It is to be noted also that the second and third mirrors 14,15, carried by the half-speed supporting member 22, and the fourth and fifth mirrors 16,17, carried by the third supporting member 24, can be moved to the regions in the close proximity of the lens 1 when scanning the manuscript or when the copy size is to be reduced. Therefore, any offset of respective mirrors may lead to a large misalignment of the optical axis. According to the invention, however, the optical precision of these mirrors can be maintained rather easily because these mirrors are carried by common guide shafts 23. Furthermore, the correction of misalignment of the optical axis can be made simply by adjusting the second guide shaft 23.

A wire 26 is wound several turns round a driving pulley 25 fixed to the body of the copying machine and leads through stationary pulleys 27,28 on the body of the copying machine to a movable pulley 29. After making a 180° turn around the movable pulley 29, the wire 26 further leads past a fixed pulley 30 to a terminal 31 of a slider of the magnification changing device. The terminal 31 is adapted to be held stationarily at a fixed position in the ordinary copying operation, i.e. when the constant-speed supporting member 20 and the half-speed supporting member 22 move at the speed ratio of 2:1. For varying the magnification, the terminal 31 is moved in a manner which will be explained later.

The wire 26 further leads from the terminal 31 and is turned by a stationary pulley 32 and turned once more by a movable pulley 33 which is coaxial with the movable pulley 29 on the half-speed supporting member 22. The wire then leads back to the driving pulley 25 through stationary pulleys 34 and 27.

The constant-speed supporting member 20 has one end 35 which is fixed to the portion of the wire 26 stretched between the stationary pulley 28 and the movable pulley 29. Therefore, as the driving pulley 25 is rotated clockwise as indicated by an arrow G, the constant-speed supporting member 20 is moved to the left, while the half-speed supporting member 22 moves at a speed which is a half the speed of the movement of the constant-speed supporting member 20. After the completion of the scanning for optical exposure, the driving pulley 25 is reversed so that the supporting members are reset to the starting positions.

A reference numeral 36 designates a retaining member such as a pin provided on the half-speed supporting member 22. This retaining member 36 supports the coaxial movable pulleys 29 and 33. This retaining member may be provided on a portion of the half-speed supporting member 22 other than the portion shown in FIG. 4. A reference numeral 37 designates a lever provided with an engaging portion such as a notch at a position thereof corresponding to the pin 36. The lever 37 is adapted to rock up and down by the operation of a solenoid connected to one end thereof.

The construction of the magnification changing mechanism for effecting the controlled movement of the supporting members will be explained hereinunder with specific reference to FIG. 5.

Figure 5:
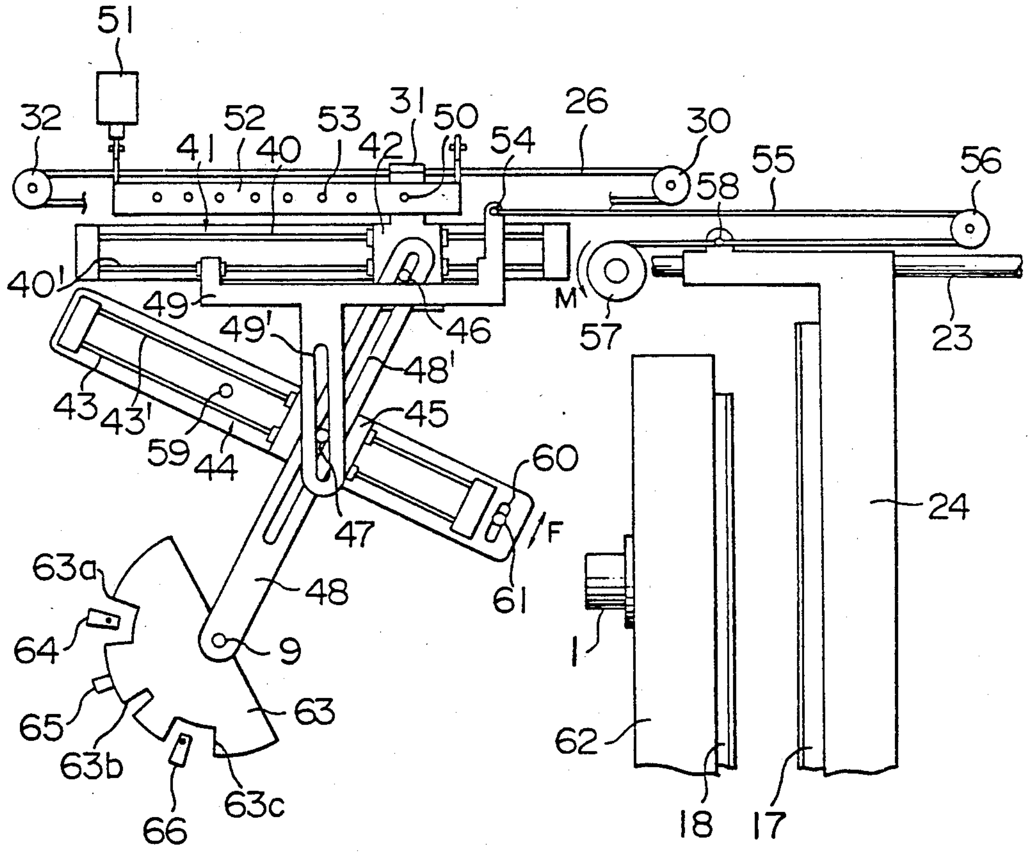
FIG. 5 is a plan view of an essential part of the magnification changing device embodying the invention.

FIG. 5 is a plan view of a mechanism which is constructed to maintain the relationship expressed by the formula (II) between the values x and y. A first guide member 41 having two guide shaft 40,40′ constituting the first straight line or first longitudinal axis 4 is disposed in parallel with the optical axis of the lens. This first guide member 41 carries a first slider 42 slidable along the guide shafts 40,40′. A second guide member 44 has two guide shafts 43,43′ which constitute the second straight line or second longitudinal axis intersecting the first straight line at an angle $\theta$. The second guide member 44 is positioned with respect to the first guide member 41 so as to meet the requirement of the formula (III) mentioned before. A second slider 45 is carried by the second guide member 44 for sliding movement along the guide shafts 43,43′. The first and second sliders 42 and 45 are provided with pins 46 and 47. A lever 9 is pivotally held at the point 9 mentioned before. The pins 46 and 47 are slidably received by an elongated slot 48′ formed in the lever 48. The first guide member 41 carries a third slider 49 for sliding movement along the guide shafts thereof. The third slider 49 is provided in one end thereof with an elongated slot 49′ which slidably receives the pin 47 on the second slider 45. The first slider 42 carries a pin 50 which is adapted to engage one of magnification setting holes 53 formed in a positioning plate 52 which is adapted to be moved vertically as viewed in FIG. 5 by the operation of a solenoid 51. The third slider 49 mentioned before is provided with a terminal 54 to which a magnification changing wire 55 is connected. The wire 55 is turned around a stationary roller 56 and is wound round a pulley 57 which is rotationally biased in the counterclockwise direction as indicated by an arrow M. The third supporting member 24 is fixed at a portion 58 thereof to the portion of the wire 55 stretched between the stationary pulley 56 and the pulley 57.

According to this arrangement, as the terminal 31 on the first slider 42 is pulled in both directions by the wire 26, the first slider 42 is also slid to the left and right. Consequently, the lever 48 swings about the pivot point 9, so that the second slider 45 and the third slider 49 are slid following the movement of the first slider 42.

Figure 2:
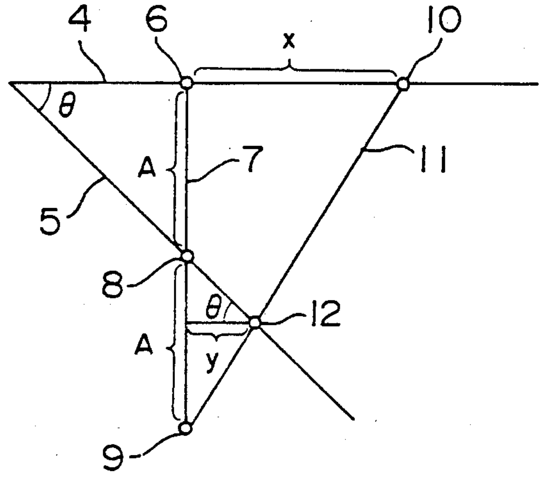
FIG. 2 is a diagram for explaining the principle of the magnification changing device in accordance with the invention.

In consequence, as the terminal 31 of the first slider 42 is moved by a distance x to the right, as viewed in FIG. 2, from the position of the equal-size position, i.e., from the position at which the lever 48 is held vertically in FIG. 5, the second slider 45 is moved along the second guide member 44 from the position corresponding to the point 8 in FIG. 2 to a position corresponding to the point 12 in FIG. 2.

Consequently, the second slider 45 drives the third slider 49 which is guided by the first guide member 41. Therefore, the third slider 49 is moved in the direction parallel to the guide member 41 by a distance y, in response to the movement of the second slider 45 from the position corresponding to the point 8 to the position corresponding to the point 12 in FIG. 2. This means that the terminal 54 of the third slider 49 is moved to the right by a distance y which is calculated from the formula (II). Thus, the amount of movement of the terminal 31 corresponds to the amount of movement of the first mirror 13 shown in FIG. 3, while the amount of movement of the terminal 54 corresponds to the amount of movement of the fourth and fifth mirrors 16,17 in FIG. 3. Consequently, it is possible to select the desired degree of magnification for scaling up and down the copy size, without causing the image to come out of focus.

The second guide member 44 is carried rotatably by, for example, a pin 59, and is provided at its other end with an adjusting mechanism constituted by an elongated hole 60 and a fixing screw 61. This adjusting mechanism permits a delicate adjustment of the second guide member 44 in the direction of the arrow F thereby to permit a fine adjustment of the angle $\theta$ at which the second guide member 44 intersects the first guide member 41 so as to compensate for any fluctuation of the focal length f of the lens which may be incurred during manufacturing of the lens or any offset of the lens which may be occasioned during mounting of the lens, thereby to ensuring the focussing of the image at all degrees of magnification. The supporting point at which the second guide member 44 is rotatably supported, i.e. the pin 59, is provided at a position corresponding to point 8 in FIG. 2 at which the vertical line extended from the point 6 on the first straight line 4 to the pivot point 9 intersects the second straight line 5 constituted by the second guide member 44.

In general, slight fluctuation of focal length of the lens is inevitable due to fluctuation of the glass material or fluctuation in the final size. Therefore, when a multiplicity of copying machines are produced using such a lens, it is necessary to delicately adjust the mounting position of the lens or minutely relocate the mirrors so as to compensate for the fluctuation of the focal length. Such adjustment and relocation of lens and mirrors are extremely troublesome and time-consuming.

It is to be pointed out also that a correct focussing at one selected degree of magnification does not always ensure the focussing at another degree or degress of magnification. Therefore, a slightly out-of-focus state has been regarded as being permissible in the conventional copying machine. For mass production of copying machines in which images can be well focussed at all degrees of magnification, it is necessary to use only those lenses having a designated focal length. This, however, uneconomically increases the number of unacceptable lenses.

This problem, however, is overcome by the invention in which the fluctuation of focal length of the lens can be absorbed by the adjusting mechanism which rotatably holds the supporting plate supporting the guide member along which the second slider slides. Namely, the invention offers a great advantage in that the image can be correctly focussed at any desired degree of magnification, once the aforementioned angle $\theta$ is adjusted by the adjusting mechanism at any one degree of magnification.

The illustrated embodiment of the invention operates in a manner which will be explained hereinunder.

Referring to FIG. 4, as the solenoid 39 is energized, the lever 37 is magnetically attracted and, at the same time, the driving pulley 25 starts to rotate clockwise as indicated by an arrow G. The retaining member 36 provided on the half-speed supporting member is moved slightly to the left into engagement with the engaging portion 38 of the lever 37 which has been raised by the solenoid 39. The solenoid 51 shown in FIG. 5 is energized simultaneously with the energization of the solenoid 39. As a result, the solenoid 51 attracts the positioning plate 52 to move the same perpendicularly to the plane of FIG. 5, i.e. towards the viewer, thereby to allow the pin 50 on the first slider 42 to the disengaged from the positioning plate 52. As the driving pulley 25 is rotated in this state in the direction indicated by the arrow G, the terminal 31 fixed to the wire 26 is moved to the right. Therefore, the first slider 42 is moved to the right to the position corresponding to the aimed degree of magnification, so that the second slider 45 is moved by the lever 48, followed by the movement of the third slider 49. As a result, the terminal 54 is moved to the right by a distance calculated from the formula (II) so that the wire 55 is taken up on the pulley 57 by an amount corresponding to the travel of the terminal 54. As a result, the third supporting member 24 fixed to the wire 55 is moved to the left to cause a movement of the third reflecting mirror system constituted by the fourth and fifth mirrors 16,17 toward the lens 1. It is thus possible to obtain a good state of focussing of the image at any desired degree of magnification as detailed in FIG. 3.

When the position corresponding to the aimed degree of magnification is reached, sensors 64,65 and 66 disposed around the encoder disc 63 produce signals to stop the power supply to the solenoid 51, so that the hole 53 corresponding to the selected degree of magnification comes to receive the pin 50. At the same time, the power supply to the solenoid 39 is stopped.

Consequently, the half-speed supporting member 22 is released and becomes freely movable, so that the first reflecting mirror system scans the manuscript as a result of rotation of the driving pulley 25. Then, the driving pulley 25 is reversed to return the first reflecting mirror system to the scanning starting position, i.e. to the position taken by the mirror system before the commencement of the magnification changing operation. The magnification device thus gets ready for making the magnification changing operation.

In the described embodiment of the invention, the half-speed supporting member 22 and the third supporting member 24, which are disposed at opposite sides of the lens 1, are guided by the same guide shafts, i.e. the second guide shafts 23. Fortunately, however, these supporting members do not collide with each other because the half-speed supporting member 22 does not move beyond the lens 1, although it can take a position very close to the lens 1, nor does the third supporting member 24 move beyond the lens 1, although it approaches the lens when the minimum degree of magnification is selected.

As shown in FIG. 4, the lens 1 is fixed to the lens housing 62, to which also is fixed the sixth mirror 18 so as to form a lens housing unit.

The aforementioned encoder disc 63, having peripheral notches 63a to 63c, is secured to the pivot supporting point 9 of the lever 48 so as to rotate in response to the rocking of the lever 48. The position of the encoder disc 63 is sensed by the sensors 64,65 and 66, disposed around the encoder disc 63, and sensitive to the notches 63a to 63c. The sensors 64 to 66 may be photo-sensors. In such a case, these sensors are turned on when they are exposed through the notches 63a,63b and 63c and turned off when they are concealed behind the portions of the decoder disc 63 between adjacent notches. The sensors are selectively turned on to produce signals corresponding to different degrees of magnification, thereby to stop the power supply to the solenoid 51 so as to lower the positioning plate 52. Consequently, the pin 50 on the first slider 42 is brought into engagement with the hole 53 corresponding to the selected degree of magnification, thereby locking the magnification changing mechanism at this magnification degree.

The positioning plate 52 can have notches in place of the holes, corresponding to the minimal to maximal degrees of magnification required for the copying machine. In the illustrated embodiment, eight holes in total, i.e., five holes for scaling down, one hole for equal copy size and two holes for scaling up are provided. Other combinations of magnification degrees, e.g., four scaled-down sizes, equal size and three scaled-up sizes, can easily be attained by suitably changing the positions of the holes or the position of the positioning plate itself.

Although not shown in the drawings, a D.C. motor having an FG (frequency generator) is used as the means for actuating the optical system driving pulley 25. The FG produces pulses of a frequency corresponding to the speed of the motor. A signal representing the frequency of the pulses is compared with a reference signal produced by a reference signal generator. When the motor speed is lower than the reference speed, a control is made to increase the motor speed, whereas, when the motor speed is higher than the reference speed, a control is made to lower the motor speed. Thus, the motor speed is maintained at a constant level by the feedback speed control. A plurality of reference signals are prepared corresponding to the available degrees of magnification. The reference signals are used selectively in conformity with the selection of the magnification degree.

The reversing of the optical system is conducted by reversing the D.C. motor by applying thereto a reverse voltage.

In the described embodiment, the arrangement is such that the third reflecting mirror system is operatively connected to the first reflecting mirror system to move following up the movement of the first mirror system so as to attain the desired degree of magnification. This, however, is not exclusive and the arrangement may be such that the first reflection mirror system is kept stationary while the second reflection mirror system alone is moved to the left as viewed in FIG. 3. It is also possible to make an arrangement such that the first and the second reflecting mirror systems are moved simultaneously to the right and left, respectively. All that is required by the present invention is that the distance between the first reflecting mirror system and the second reflecting mirror system and the distance between the lens and the third reflecting mirror system be varied in a predetermined relation to each other in order to attain the desired degree of magnification.

As will be realized from the foregoing description, the present invention offers various advantages as summarized below.

The magnification changing device incorporates a magnification changing mechanism which includes a first guide member, a first slider slidingly guided by the first guide member, a second guide member intersecting the first guide member at a predetermined angle, a second slider guided by the second guide member, and a lever pivotable around a point having a fixed positional relationship to the first guide member and operatively connecting the first slider and the second slider. The lever serves to maintain a predetermined relationship between the travel of the first slider and the projection of the travel of the second slider on the first guide member, the relationship being identical to that between respective travels of the reflecting mirror systems disposed at both sides of the fixed magnifying lens.

In consequence, according to the invention, it is possible to change the magnification in the copying machine by quite a simple arrangement, in contrast to the conventional machines in which the mirrors and the lens are operated independently to attain good focussing of image at each degree of magnification.

According to the invention, a further simplification of arrangement is achieved by the use of a third slider slidable along the first guide member for attaining the amount of projection of the travel of the second slider on the first guide member.

In the described embodiment, the magnification mechanism is adapted to be locked at any desired degree of magnification corresponding to the holes formed in the positioning plate. However, since the magnification changing mechanism can assure the focussing of the image at any desired position along the length of the positioning plate, a greater number of magnification degrees becomes available simply by increasing the number of holes in the positioning plate.

Furthermore, since the movement of the first slider automatically determines the amounts of movement of the reflecting mirror systems, the desired degree of magnification can be achieved by a single action. This conveniently facilitates the operation of the copying machine and permits a reduction in the production cost of the same.

The invention permits also an easy compensation for any fluctuation of focal length of the magnifying lens which is inevitably incurred during fabrication or mounting. In general, fluctuation of the focal length is caused inevitably in the course of fabrication due to a fluctuation of the refractive index of the material or lack of dimensional precision. In the mass-production of a copying machine, therefore, it is necessary to effect a relocation of the lens and/or delicate adjustment of positions of mirror in each product in order to compensate for the fluctuation of the focal length of the lens. The relocating and adjusting operations are quite difficult and time-consuming. It is to be noted also that focussing at one of a plurality of magnification degrees does not always ensure exact focussing at another degree of degrees of magnification. Hitherto, therefore, a slight out-of-focus state has been regarded as being permissible. In order to attain exact focussing at any desired degree of magnification, it is necessary to strictly select the lens and to use only lenses having the designated focal length. Consequently, in mass production of a copying machine, a large quantity of lenses will be rejected as unacceptable. The invention provides a solution to this problem. Namely, in the magnification changing device of the invention, an easy adjusting operation can be made to compensate for any fluctuation of the lens focal length, using an adjusting mechanism which rotatably holds the supporting plate supporting the guide member for guiding the sliding motion of the second slider. It is to be noted also that, once this adjustment is made at one of the degrees of magnification, exact focussing can be automatically achieved at all other degrees of magnification. Consequently, the tolerance or allowance for the lens focal length becomes large thus reducing the number of the lenses which would be rejected, and the adjustment for focussing is facilitated and can be finished in a short time because the adjustment at any desired magnification degree automatically ensures exact focussing at other magnification degrees.

Finally, it is to be understood that, since the scanning of a manuscript and the operation of the magnification changing device can be made by the power derived from a common driving motor, the construction of a copying machine with a magnification changing device is further simplified to allow a further reduction in the production cost. The use of the common driving motor affords a compact construction and enables the optical scanning system and the magnification changing device to operate in synchronism with each other. Consequently, the invention provides a high reliability of operation of a copying machine with a magnification changing device.

Although the invention has been described through specific terms, it is to be noted that the described embodiment is only illustrative and various changes and modifications may be imparted thereto without departing from the scope of the invention which is limited solely by the appended claims.

What is claimed is:

1. A magnification changing device for a copying machine comprising:

a first reflecting mirror system adapted to be moved at a constant speed and arranged to receive the optical image from an object, said first reflecting mirror system being constituted by a first mirror reclined at an angle of 45° to the plane of said object;

a second reflecting mirror system adapted to receive the light reflected by said first reflecting mirror system and to move in the same direction as said first reflecting mirror system at a speed which is a half that of the movement of said first reflecting mirror system, said second reflecting mirror system being constituted by a second mirror having a reflecting surface parallel to the reflecting surface of said first mirror, and a third mirror having a reflecting surface orthogonally opposing the reflecting surface of said second mirror;

a fixed lens upon which the light reflected by said second reflecting mirror system impinges;

a movable third reflecting mirror system adapted to receive the light coming through said lens, said third reflecting mirror system being constituted by a fourth mirror having a reflecting surface orthogonally opposing the reflecting surface of said third mirror across said lens, and a fifth mirror having a reflecting surface orthogonally opposing the reflecting surface of said four mirror; and a magnification changing mechanism for moving said reflecting mirror systems in synchronism with each other such that a relationship corresponding to a varying magnification degree is maintained between the distance between said first and second reflecting mirror systems and the distance between said lens and said third reflecting mirror system, whereby any desired magnifcation degree may be effected by said magnification changing mechanism while focussing the light from said third reflecting mirror system on a photosensitive material.

2. A magnification changing device according to claim 1, wherein said first reflecting mirror system and said second reflecting mirror system are mounted, respectively, on a first supporting member and a second supporting member, said members being adapted to move at a speed ratio of 2:1; and wherein said third reflecting mirror system is carried by a third supporting member, said first supporting member is slidably carried by first guide shafts arranged in parallel with the optical axis of said lens and said second and third supporting members are slidably carried by common guide shafts extended in parallel with said first guide shafts.

3. A magnification changing device according to claim 1, wherein said magnification changing mechanism includes a first guide member, a first slider slidable along said first guide member, a second guide member disposed to intersect said first guide member at a predetermined angle, a second slider slidable along said second guide member, and a lever having a pivot point at a position spaced by a predetermined distance from said first guide member, said lever being adapted to pivot around said pivot point in response to the movement of said first slider thereby causing the sliding movement of said second slider along said second guide member, the travel of said first slider and the component of the travel of said second slider parallel to said first guide member corresponding, respectively, to the travels of said first reflecting mirror system and said third reflecting mirror system.

4. A magnification changing device according to claim 3, further comprising a third slider mounted on said first guide member and slidable in response to the sliding movement of said second slider along said second guide member, means for translationally transmitting the movement of said second slider to said third slider, and a power transmitting member through which said third slider is connected to said third reflecting mirror system.

5. A magnification changing device according to claim 3, wherein said first guide member has a first longitudinal axis, and said first slider is slidable in the direction of said first longitudinal axis; said second guide member has a second longitudinal axis which intersects said first longitudinal axis at said predetermined angle $\theta$, and said second slider is slidable in the direction of said second longitudinal axis; the pivot point of said lever is disposed on a line which is perpendicular to said first longitudinal axis and intersects said second longitudinal axis, the distance A between the points at which said line intersects said first and second longitudinal axes being equal to the distance between said pivot point and the point at which said line intersects said second longitudinal axis; said lever being swingable around said pivot point in synchronism with the sliding movement of said first and second sliders, the movement of said first slider and the component of the movement of said second slider parallel to said first longitudinal axis corresponding respectively to the movements of said first and third reflecting mirror systems disposed at opposite sides of said fixed lens wherein said lens has a focal length f, said distance A, angle $\theta$ and focal length f being related such that $$f=2A/\tan\theta.$$

6. A magnification changing device according to claim 5, wherein the angle $\theta$ of intersection of said first and second longitudinal axes is adjustable.

7. A magnification changing device according to claim 5, wherein said second guide member for guiding the sliding motion of said second slider is provided with an adjusting mechanism for adjusting said angle $\theta$, said adjusting mechanism including a supporting portion for rotatably supporting said second guide member and means for causing rotation of said second guide member around said supporting portion.

* * * * *